Figure 1:
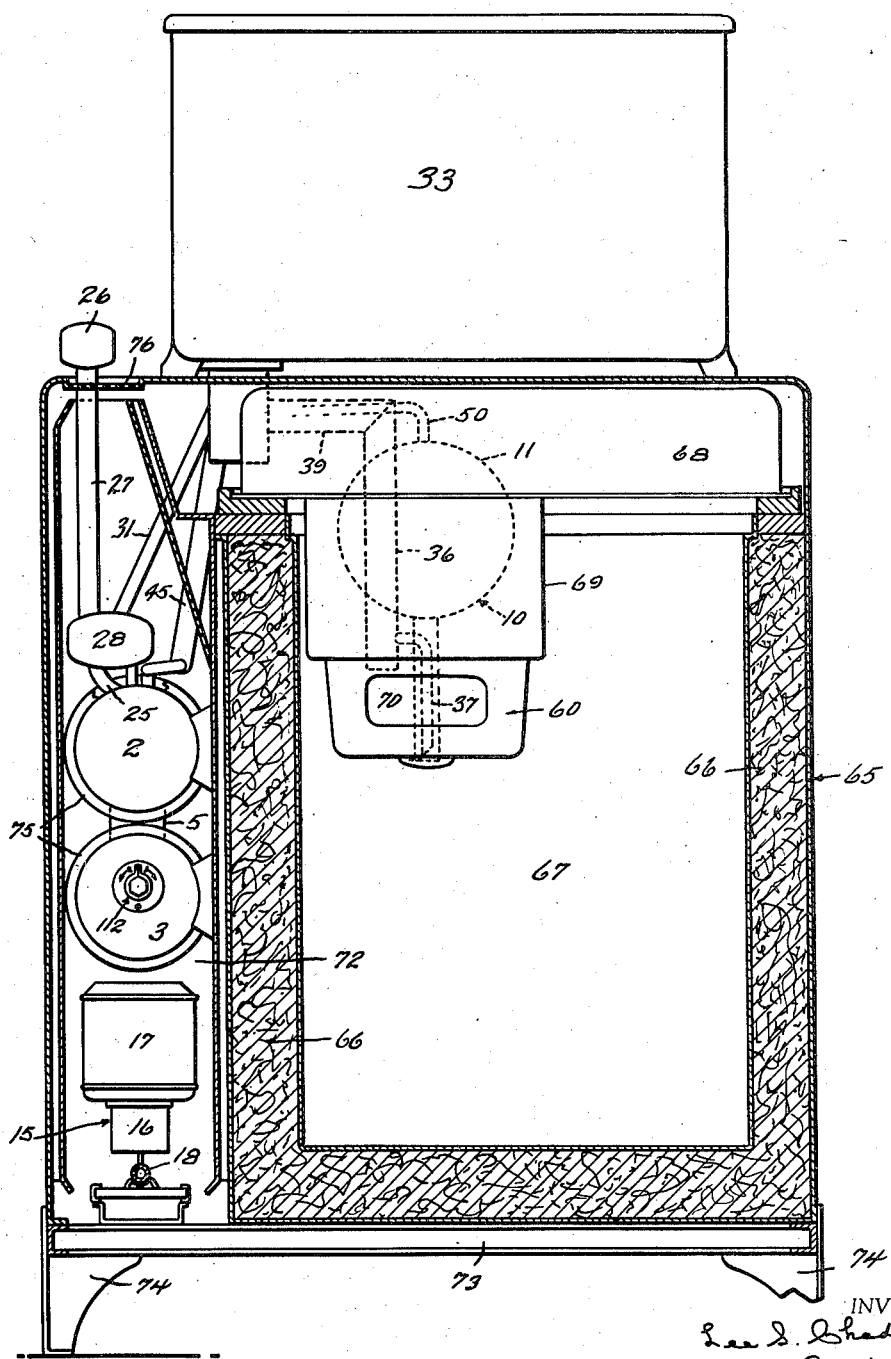

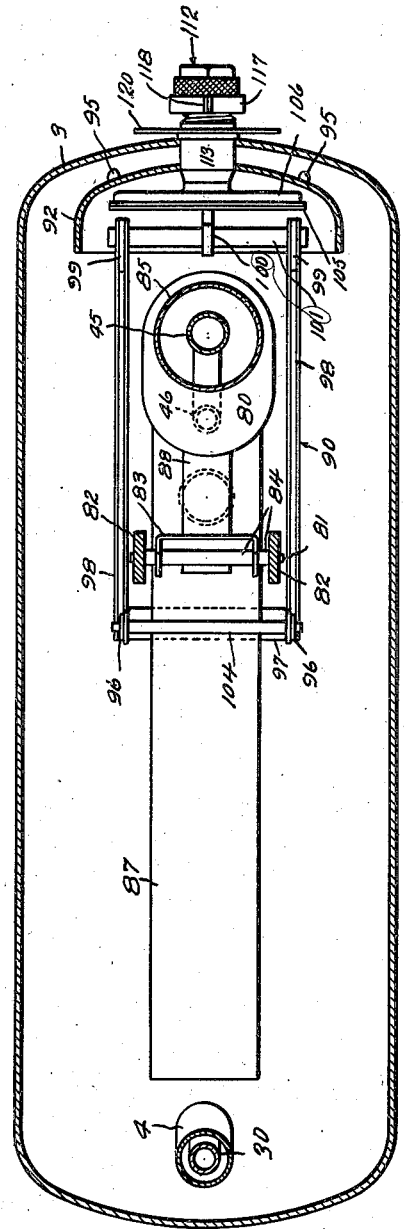
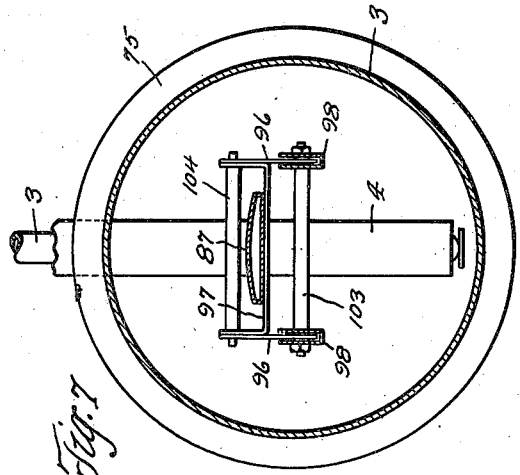
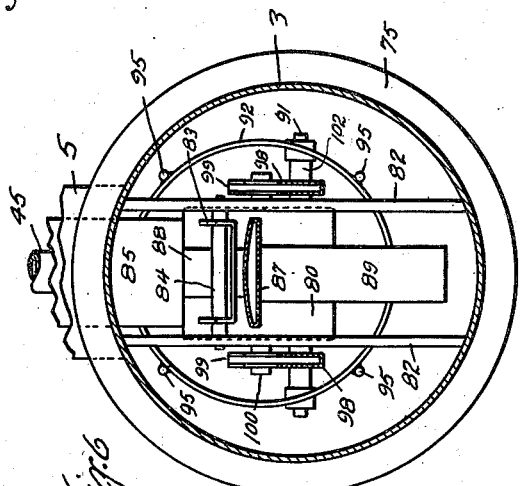

Dec. 14, 1937.  L. S. CHADWICK ET AL  2,102,056
REFRIGERATION CONTROL MEANS AND METHOD
Filed Nov. 28, 1934  11 Sheets-Sheet 6

INVENTORS
Lee S. Chadwick
Marc Rieck and
Wilbur J. Midnight
BY
Hull, Brock & West,
ATTORNEYS.

Dec. 14, 1937.   L. S. CHADWICK ET AL   2,102,056
REFRIGERATION CONTROL MEANS AND METHOD
Filed Nov. 28, 1934   11 Sheets-Sheet 7
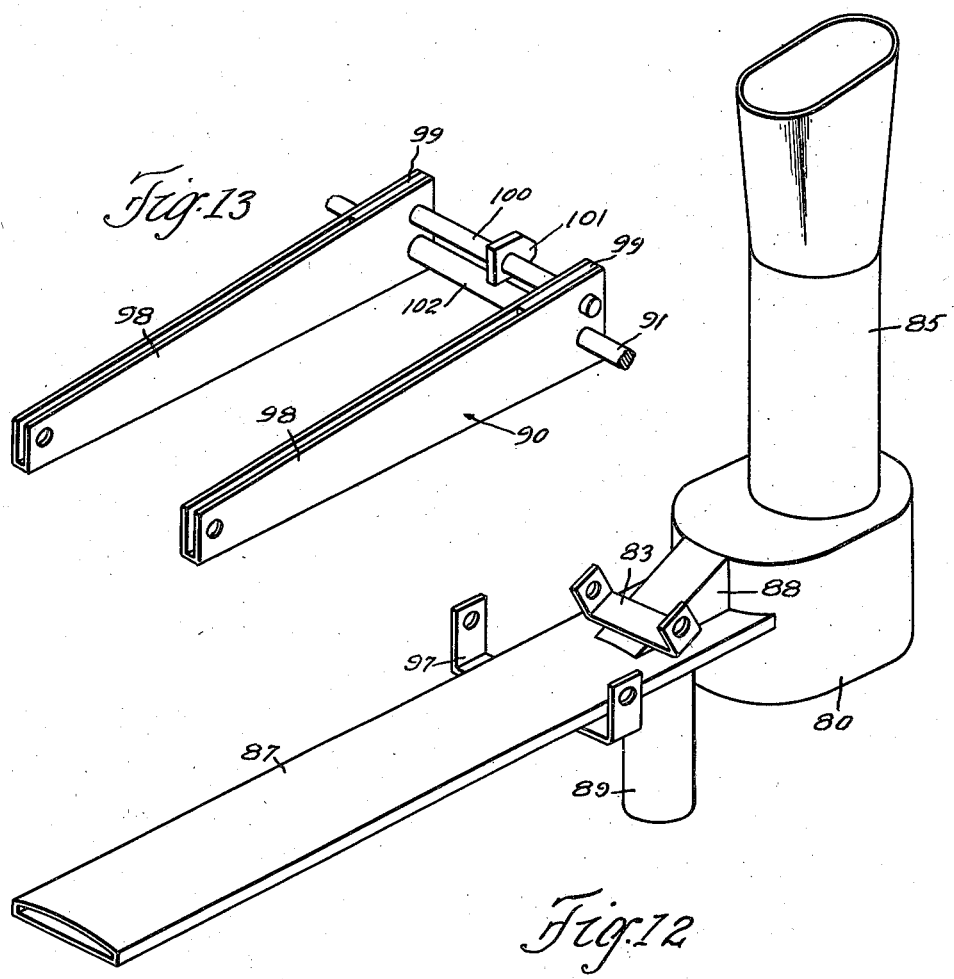
INVENTORS
Lee S. Chadwick
Marc Reseck and
Wilbur D. Midnight
BY
Hull, Brock & West
ATTORNEYS

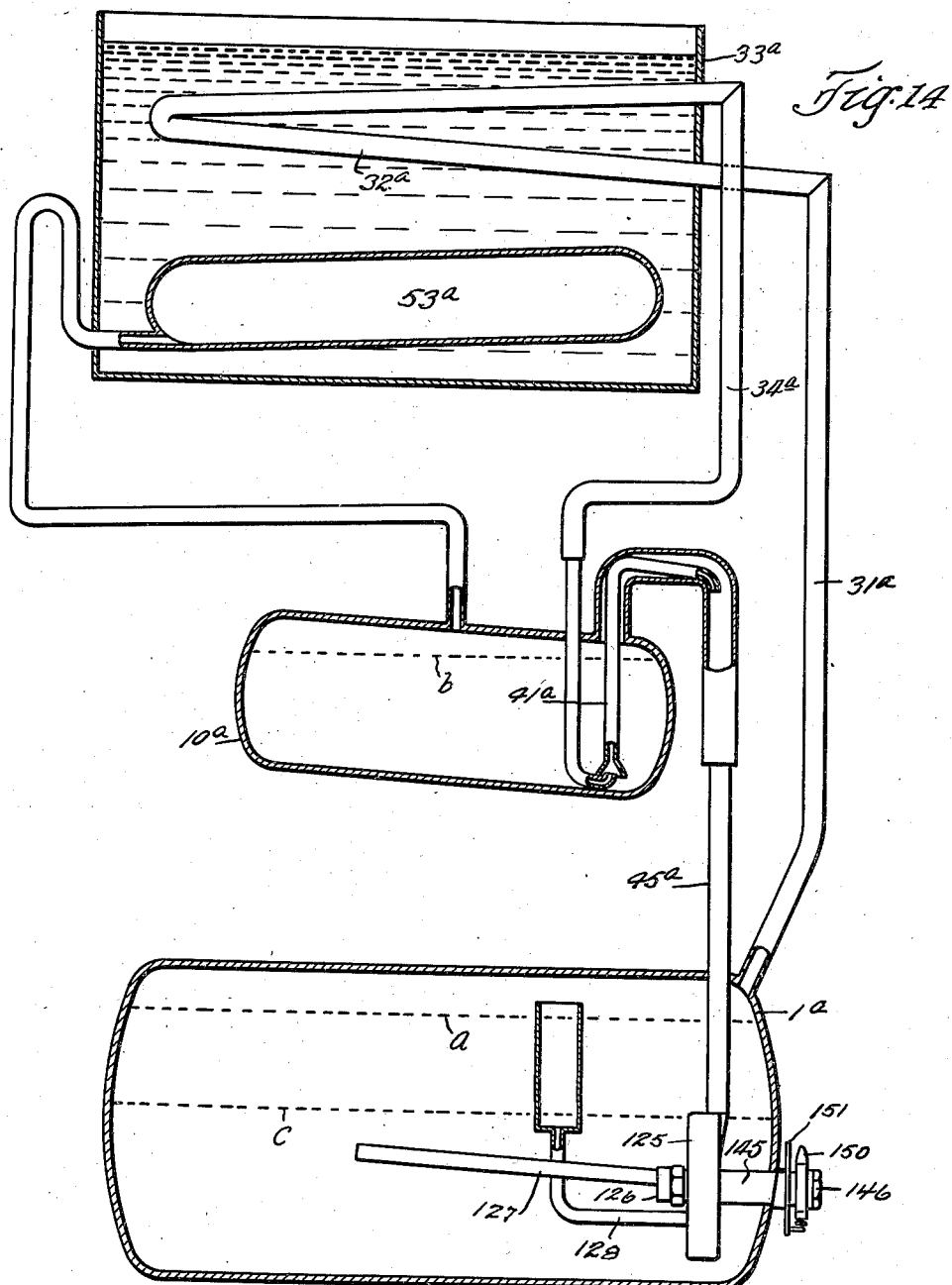

Dec. 14, 1937. L. S. CHADWICK ET AL 2,102,056
REFRIGERATION CONTROL MEANS AND METHOD
Filed Nov. 28, 1934 11 Sheets-Sheet 9
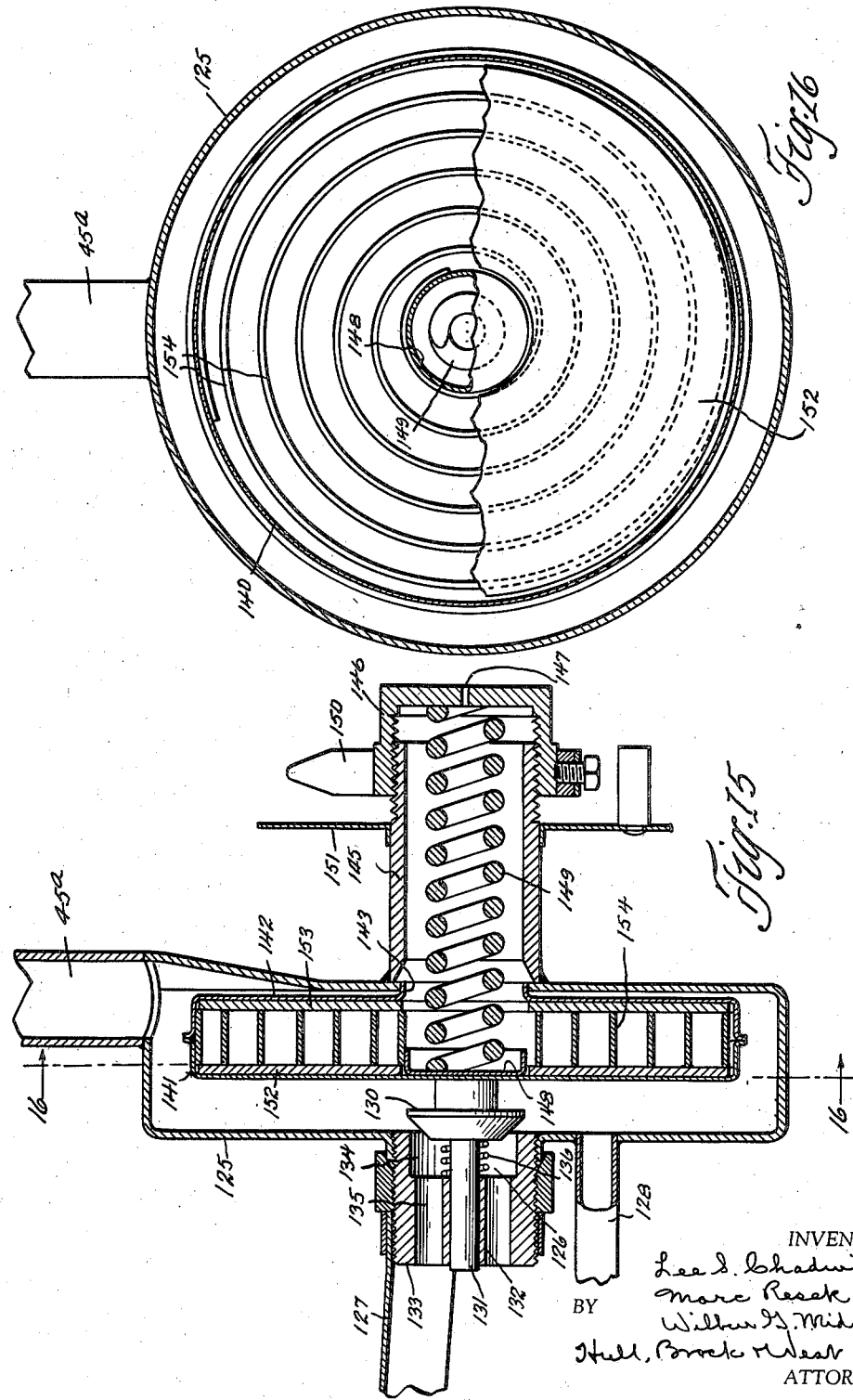
INVENTORS
Lee S. Chadwick
Marc Resek and
Wilbur G. Midnight
BY Hull, Brock & West
ATTORNEYS

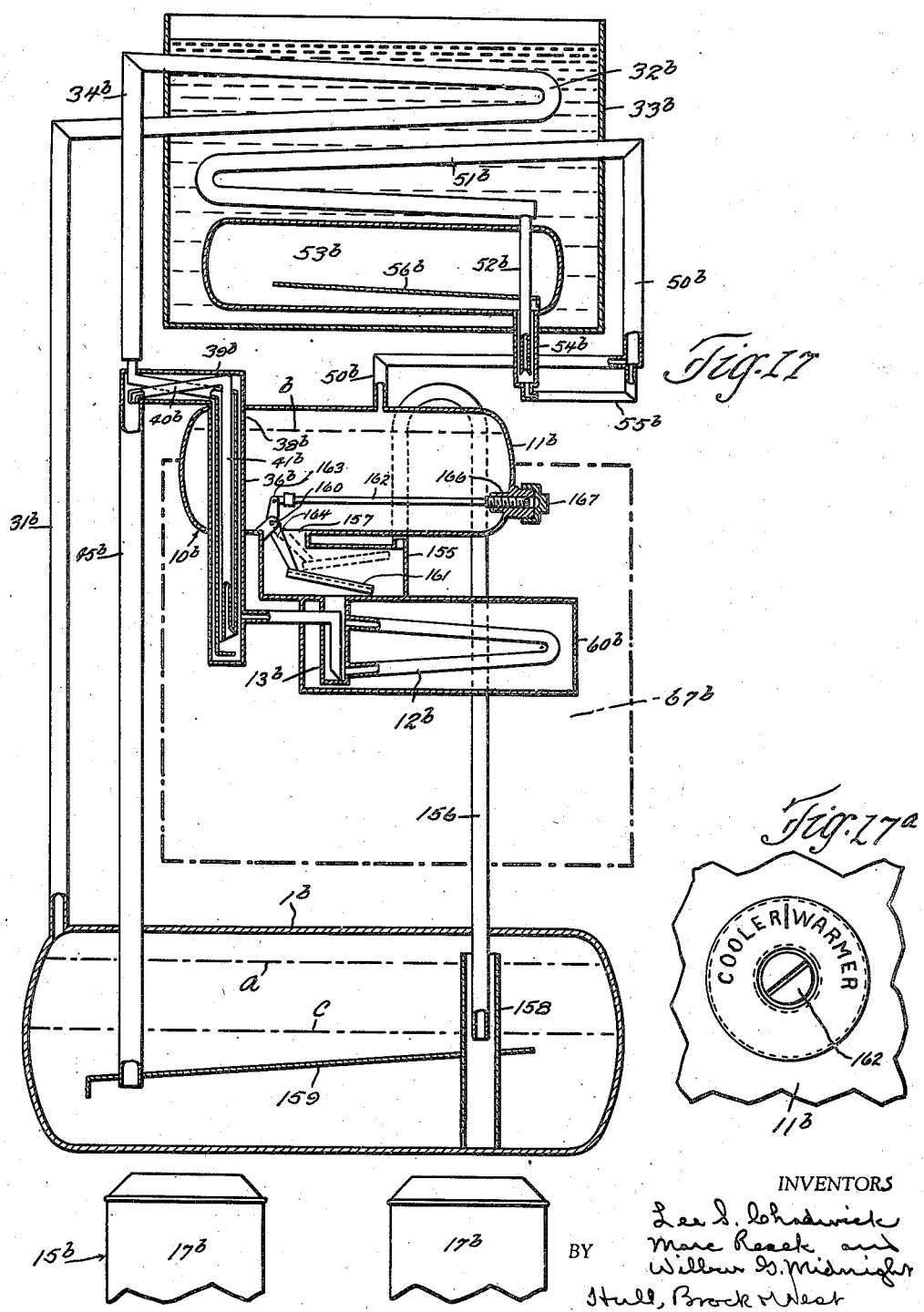

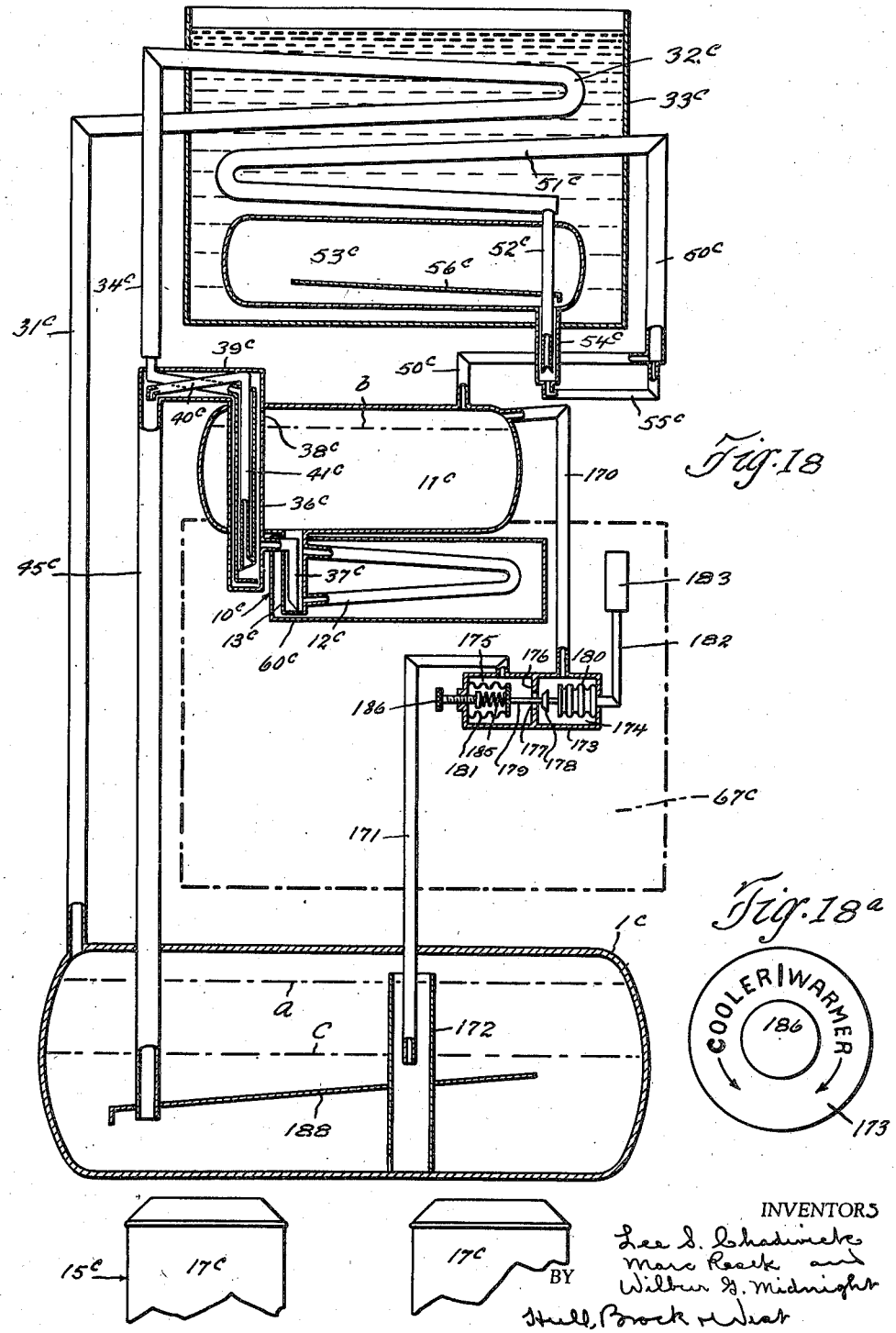

Patented Dec. 14, 1937

2,102,056

UNITED STATES PATENT OFFICE 2,102,056

REFRIGERATION CONTROL MEANS AND METHOD

Lee S. Chadwick, Shaker Heights Village, Marc Resek, Cleveland Heights, and Wilbur G. Midnight, Bay Village, Ohio, assignors to Perfection Stove Company, Cleveland, Ohio, a corporation of Ohio Application November 28, 1934, Serial No. 755,180

41 Claims. (Cl. 62—5)

This invention relates to intermittent absorption refrigeration as exemplified, in one instance that is especially pertinent to the present case, in Patent No. 2,062,921, dated December 1, 1936.

Briefly, apparatus of the general class to which this invention pertains consists of an hermetically sealed system of vessels and conduits enclosing a quantity of refrigerant liquor and including a generator-absorber section, a receiver-evaporator section, heating means for periodically generating vapor in the former section, means for conveying said vapor from said section and ultimately delivering it in condensed form to the receiver-evaporator section during the so-called heating-condensing periods, and further means for conducting gas from the receiver-evaporator section to the generator-absorber section during the intermediate cooling periods so that said gas may be re-absorbed by the weak liquor therein. Usually, as in the patent above, an arrangement is provided for returning residue liquid from the receiver-evaporator section to the generator-absorber section at sufficiently frequent intervals to avoid such an accumulation thereof in the receiver-evaporator section as would impair the efficiency of the apparatus.

Further it may be explained that the absorber of such apparatus is exposed to the atmospheric or room temperature, while the evaporator is, of course, in intimate heat exchanging relation to the refrigeration compartment; also that the before-mentioned liquor consists of a refrigerant, such as ammonia, and a solvent therefor, such as water, in proper proportions. When the apparatus is built and conditioned for service it is charged with refrigerant liquor of a given concentration, i. e. a given percentage of refrigerant as compared to that of the solvent.

Now, with apparatus designed for the use of a refrigerant liquor of a certain concentration and to produce satisfactory refrigeration at high room temperature and heavy loads ("loads" meaning the quantity and temperature of foodstuffs and the like placed in the refrigeration compartment), it frequently happens, in the case of low room temperature, especially under light loads, that the temperature of the refrigeration compartment becomes so low that it causes foodstuffs placed therein to freeze and thus have their quality impaired or their usefulness totally destroyed. The problem is usually made more difficult by the fact that the user desires to freeze ice cubes in one section of the refrigeration compartment and to refrigerate food without freezing it in another section, which latter section is in less intimate heat exchanging relation to the evaporator than the former section. In order to do this it is necessary that the evaporator temperature be held within fairly close limits, for if the evaporator temperature becomes too low the food will freeze and if the evaporator temperature becomes too high the ice cubes will not freeze. In practice an evaporator temperature of approximately 15° F. has been found to be quite satisfactory.

It is the fundamental object of this invention to provide a method of and means for controlling the refrigerating temperature of intermittent absorption refrigeration systems or apparatus; or, more specifically, to provide means and method for preventing said temperature from dropping below a predetermined value and, incidentally, maintaining it at a substantially constant value, notwithstanding fluctuations in room temperature and/or load, within practical limits.

The invention is founded on the following fixed laws or principles inherent in absorption refrigerating systems, to-wit: that the temperature of the evaporator (and consequently that of the refrigeration compartment as it is influenced by the temperature of the evaporator) is dependent upon the pressure in the evaporator (which in the type of refrigeration machines to which this invention pertains is approximately the same as that prevailing through the intercommunicating remaining parts of the system); and that the pressure in the system and therefore in the evaporator is dependent upon the rate of absorption of the returning refrigerant gas in the absorber. In this connection, it should be remembered that the rate of absorption depends upon two things: (a) the concentration of the liquor to which the returning gas is subjected, and (b) the temperature of such liquor. Therefore, if the liquor is weak in refrigerant content and low in temperature, absorption will be fast, and pressure and refrigerating temperature low; if rich in refrigerant and high in temperature, absorption will be slow, and pressure and refrigerating temperature high. The change of either (a) or (b) in either instance will alter the rate of absorption, because either weakness of mixture or lowness of temperature is conducive of a faster rate of absorption, and vice versa; and the temperature factor of the liquor becomes important when later we treat of the influence of the room temperature on the absorber.

It is a further object of the invention, therefore, to provide means for altering the rate of absorption, under the prevailing temperature of the contents of the absorber, as by delivering the returning gas to different parts of the quantity of liquor in the absorber section of the system (which respective parts absorb the gas at different speeds according (a) to the nature of the contact between the gas and the liquor and/or (b) to the state of concentration of the liquor, and/or (c) to the temperature of the liquor, for the purpose of controlling the pressure in the system and consequently the refrigerating temperature; and additional objects are the provision of an automatic control, responsive to pressure and/or temperature, for governing the action of said means, and the provision of a manual adjustment for changing the action of said control so as to determine the temperature or pressure value at which it functions.

It may be helpful to consider the situation from another angle, to wit: that, during the cooling-evaporating period, the pressure in the system depends on the concentration and temperature of the surface of the body of liquor in the absorber because it is to this surface that the gas within the system is exposed. Any agitation of the body will reduce the concentration of its surface layer and consequently lower the pressure and likewise the refrigerating temperature. Reversely, deflecting the returning gas to the surface layer of the liquor body will increase the surface layer concentration and consequently elevate the pressure and refrigerating temperature.

More limited objects of the invention are the production of relatively simple and durable control mechanisms of the nature above set forth that are thoroughly dependable and not likely to get out of order or require inspection or attention, other than manual adjustments for effecting desired changes in operation, throughout the years of service of the refrigeration apparatus in which they are incorporated. Several embodiments of the invention are illustrated in the accompanying drawings to which reference is now made.

Figure 2:
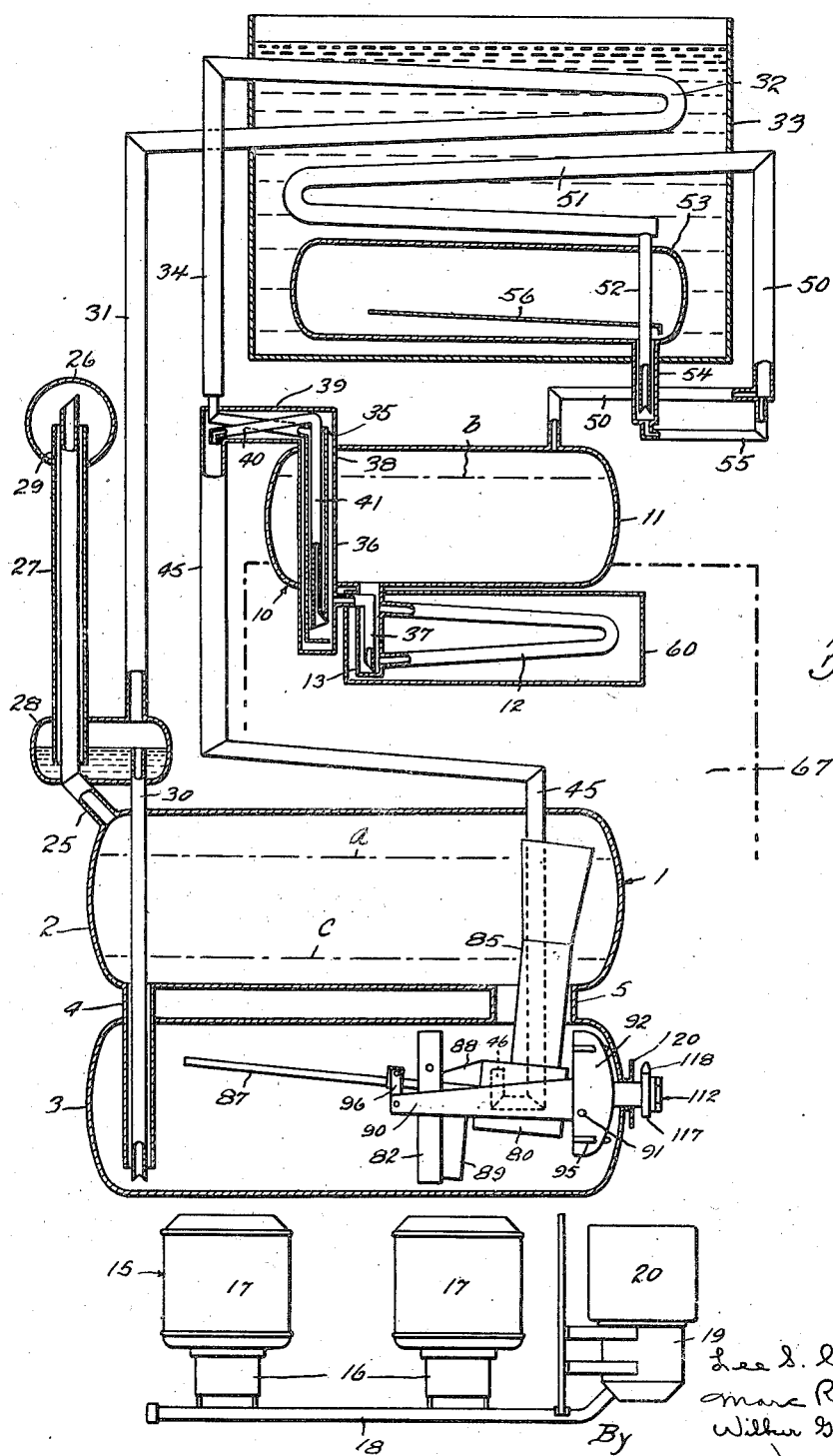
Figure 3:
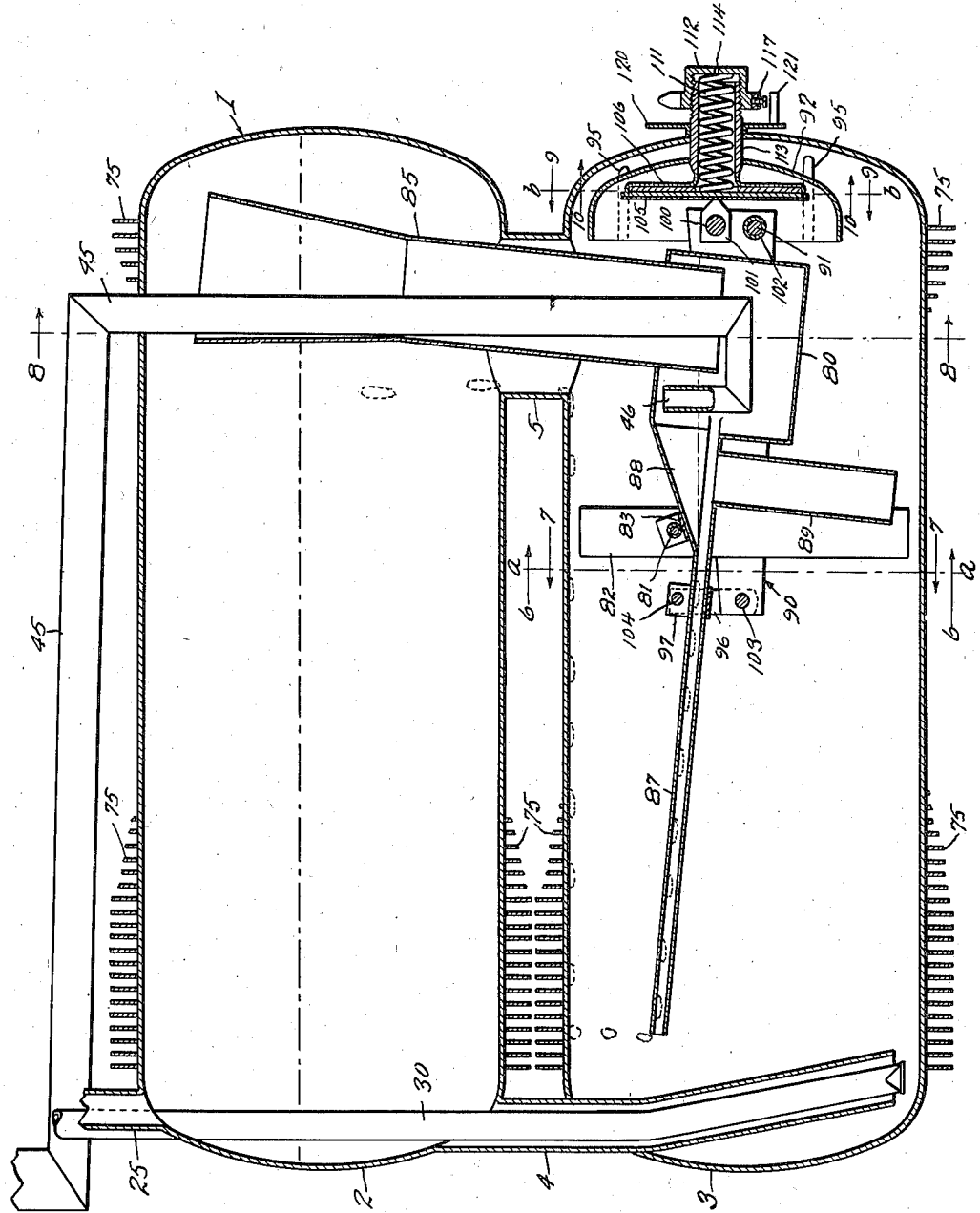
Figure 4:
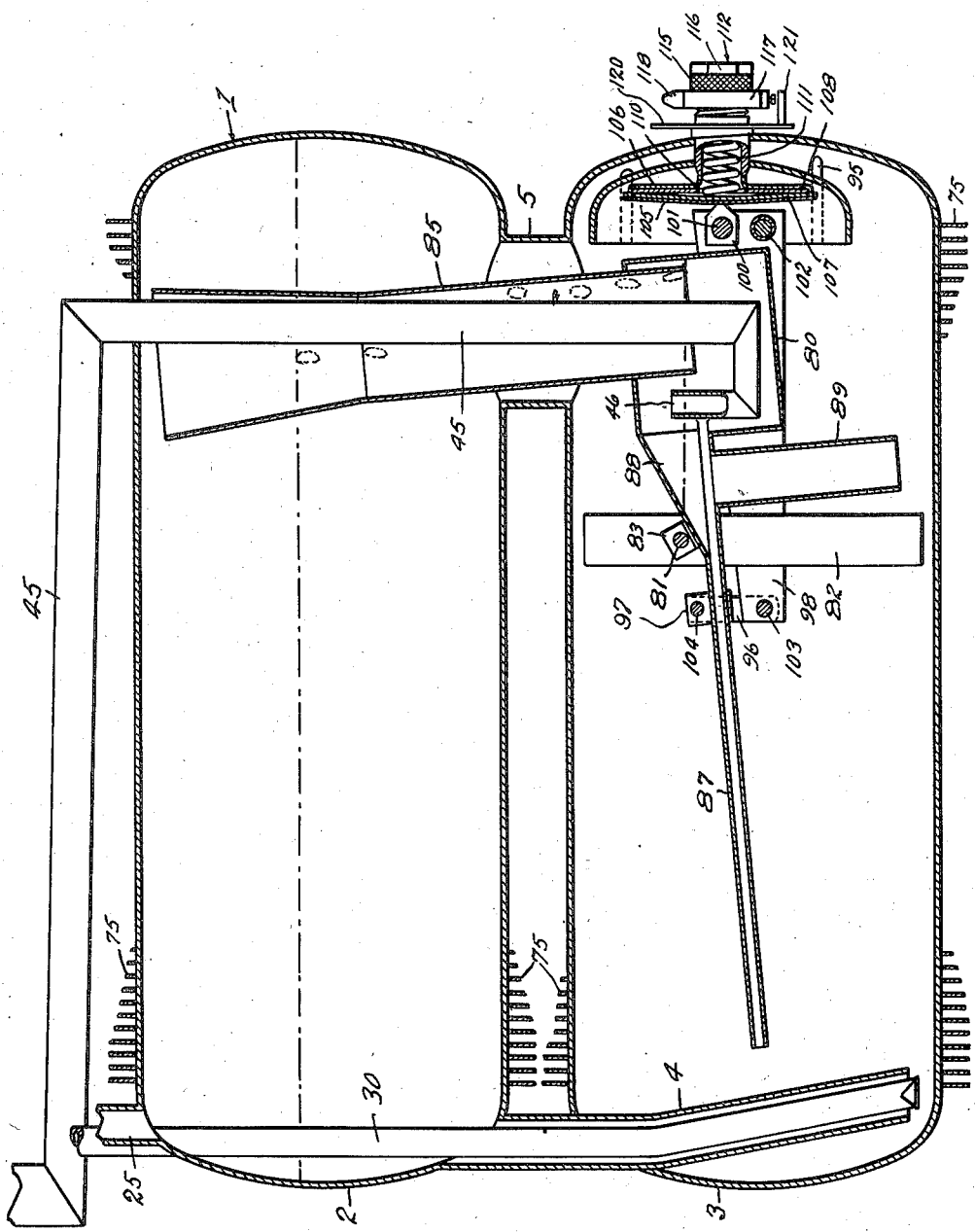
Figure 8:
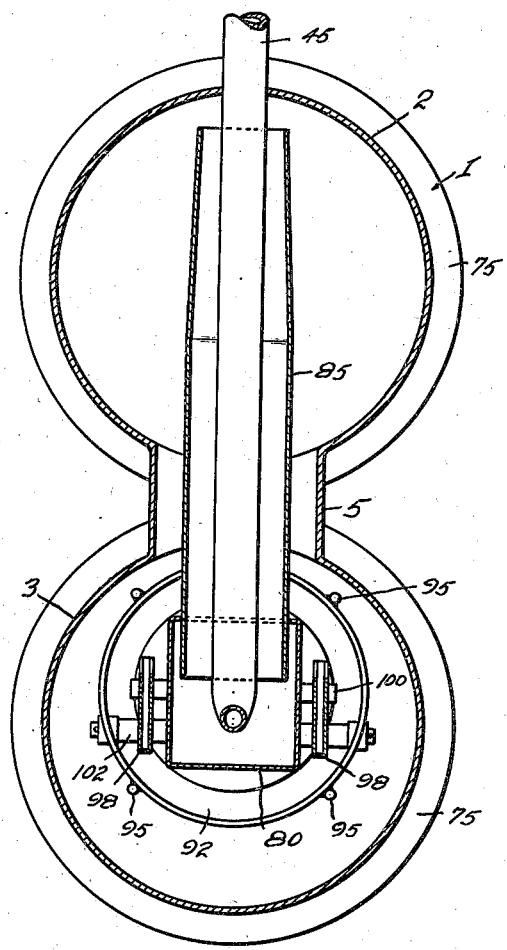
Figure 9:
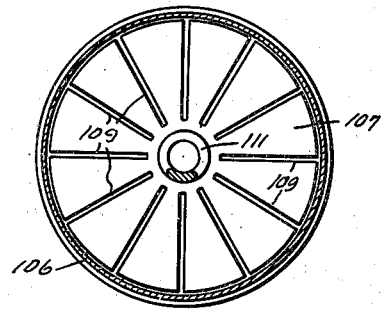
Figure 10:
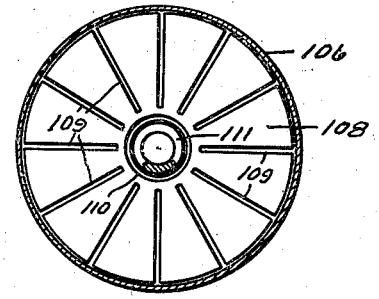
Figure 11:
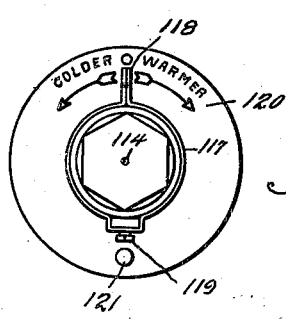

Fig. 1 is a sectional front elevation of a refrigerator incorporating the invention; Fig. 2 is a diagrammatic representation of the system of intercommunicating vessels and conduits that is incorporated in the structure shown in Fig. 1; Fig. 3 is a vertical longitudinal section through the generator-absorber, showing the control mechanism situated therein according to one embodiment of the invention, and illustrating the same in one of its extreme positions; Fig. 4 is a view similar to Fig. 3 showing the control mechanism in the other of its extreme positions; Fig. 5 is a horizontal section through the lower vessel of the generator-absorber; Figs. 6 and 7 are transverse sections on the line a—a of Fig. 3, the former view being taken as though looking in the direction of the arrows 6, 6, and the latter view as though looking in the direction of the arrows 7, 7; Fig. 8 is a vertical transverse section through the generator-absorber on the line 8—8 of Fig. 3; Fig. 9 is a section through the diaphragm casing that constitutes a part of the control mechanism, the view being taken on the line b—b of Fig. 3 as though looking in the direction of the arrows 9, 9; Fig. 10 is a similar sectional detail on the line b—b of Fig. 3 looking in the direction of the arrows 10, 10; Fig. 11 is a front view of the indicator that constitutes a part of the adjustment of the control mechanism; Figs. 12 and 13 are perspective views of the tilting vessel and bell crank lever, respectively, that are parts of the control mechanism; Fig. 14 is a diagrammatic representation of a modification of the invention showing it for illustrative purposes as embodied in a simplified system and as involving a diaphragm actuated valve as a substitute for the tilting vessel of the embodiment illustrated in the foregoing views; Figs. 15 and 16 are enlarged sectional details of the valve that forms a part of the control mechanism illustrated in Fig. 14, Fig. 16 being a section on the line 16—16 of Fig. 15; Fig. 17 is a diagrammatic representation of a refrigerating system embodying a form of the invention in which the control mechanism is situated in the receiver-evaporator section of the system, the mechanism in the present case being thermostatically operated; Fig. 17ᵃ is a detail of the adjustment of said mechanism; Fig. 18 is a diagrammatic representation of refrigeration apparatus incorporating a form of the invention in which the control mechanism is actuated by a thermostat that is subjected to the temperature of the refrigeration or food compartment, and Fig. 18ᵃ is a detail of the adjustment of the control mechanism shown in Fig. 18.

In the form of the invention structurally shown in Figs. 1 and 3 to 13, and diagrammatically illustrated in Fig. 2, 1 designates, generally, the generator-absorber. According to the embodiment at present under consideration, this element of the system consists of upper and lower vessels 2 and 3, respectively, communicatively connected together by a tube 4 and a neck 5, the same being located, respectively, near the rear and front ends of the structure. The tube 4 extends from the bottom of the upper vessel through the top of the lower vessel and terminates adjacent the bottom of the latter.

The receiver-evaporator is designated generally by the reference numeral 10 and is made up of a vessel 11, which is the receiver proper, and an evaporator 12 that is shown as a loop or coil of tubing, joined at its ends to a hollow vertical column 13 that is communicatively connected to and depends from the bottom of the vessel 11.

Means are provided for heating the contents of the generator-absorber. In the present instance the heating means, designated generally by the reference numeral 15, consists of a combustion device or, more specifically, a multiple oil burner. The burners 16, equipped with drums 17, are supplied with oil through a pipe 18 from a distributing receptacle 19 over which a reservoir 20 is inverted. The flow of oil is controlled according to the well-known barometric principle which results in a proper oil level being maintained in the burners 16.

It may here be explained that the reservoir 20 holds just enough oil to sustain a heating condensing period in the cycle of operation of the apparatus, wherefore to effect operation of the apparatus it is only necessary to deliver a full reservoir to the distributing receptacle 19 and light the burners, and when sufficient heat has been administered to the generator-absorber to distill over the required amount of refrigerant into the receiver-evaporator section of the system, the burners will go out because of the exhaustion of the fuel supply and the cooling-absorbing phase of the cycle will begin.

At the conclusion of a cycle of operation all, or practically all, of the refrigerant liquor is present in the generator-absorber 1 to approximately the level indicated by the dotted line a in Fig. 2.

When the heating means 15 is set in operation, the contents of the generator-absorber 1 starts to boil and the resultant vapors rise through a conduit 25 to a trap 26 from which they descend through a sleeve 27 that surrounds and is spaced from the conduit 25 to a rectifier 28. It will be noted that the sleeve 27 rises well within the trap 26 but is provided with an orifice 29 adjacent the bottom thereof; and that, at its lower end, said sleeve terminates near the bottom of the rectifier 28. A drain tube 30 extends from about the vertical center of the rectifier through the bottom thereof and through the upper vessel 2 of the generator-absorber 1 and through the previously mentioned tube 4 to a point adjacent the bottom of the lower vessel 3. Passing on from the rectifier (in which the greater part of solvent vapors that passed with the refrigerant vapors from the generator-absorber are arrested and returned to the generator-absorber) the vapors ascend through the conduit 31 to a dehydrator 32, that is shown as consisting of a loop of tubing that rises gradually from its receiving to its discharge end and situated within the upper portion of a tank 33 of water or other cooling liquid. The purpose of the dehydrator 32 is to condense and remove the remainder of the solvent from the vapors of the refrigerant, but even with this precaution a certain amount of solvent finds its way to the receiver-evaporator section of the system. From the dehydrator, the vapors continue through a conduit 34 to the upper end of a sleeve 35 (Fig. 2) through which they descend to the bottom of a casing 36 that encloses said sleeve and is shown as extending downwardly through the vessel 11. A transfer tube 37 leads from the bottom of the column 13 upwardly within said column and thence laterally through the side thereof and joins the casing 36 a short distance above the bottom of the latter. The interiors of the casing 36 and the vessel 11 are in constant communication through a port 38 that is situated adjacent the top of said vessel. The upper end of the casing 36 has a laterally extending portion 39 through which the part of the conduit 34 adjacent the sleeve 35 extends. Also housed within this portion 39 is the laterally turned upper end 40 of a gas lift 41 that is in the nature of a tube and is enclosed throughout the major portion of its length within the previously mentioned sleeve 35. The gas lift and sleeve open into the casing 36 near the bottom of the latter or slightly below the point of communication between the said casing and the transfer tube 37. A gas return conduit 45 leads from the laterally extending upper portion 39 of the casing 36 downwardly into the generator-absorber, the same descending substantially centrally through the neck 5 into the lower vessel 3 where it is extended laterally substantially coincident with the central axis of the lower vessel 3 (though this is incidental) and thence upwardly, the discharge end of said conduit being designated 46. This peculiar formation is given the lower end of the gas return conduit because such end constitutes a part of our control mechanism according to the embodiment first to be considered, as will more fully appear later on in this description.

A conduit 50 leads from the top of the receiver or vessel 11 to a condenser 51 in the form of a loop or coil of tubing, whose delivery end 52 extends downwardly through a reservoir 53 which, with the condenser 51, is housed within the previously mentioned tank 33. The delivery end 52 of the condenser terminates adjacent the bottom of a trap 54 that depends from the reservoir 53 and is connected, through a tube 55, with an adjacent part of the previously mentioned conduit 50. A baffle 56 is located within the reservoir 53 and extends from a point adjacent one end thereof above the trap 54 gradually upwardly to near the opposite end of the vessel. Following common practice, a brine box 60 encloses the evaporator 12.

We have already followed the course of the vapor from the generator-absorber 1 to the sleeve 35. Now, as the hot vapor descends through said sleeve about the gas lift 41, its temperature will cause bubbles to occur within any liquid that stands within the gas lift, the same being a part of that reposing within the receiver-evaporator section of the system at the conclusion of a cooling period, and which, known as residue liquid, as hereinbefore pointed out, consists principally of solvent condensate that has found its way to the receiver-evaporator. At the very conclusion of a cooling period the residue liquid may occupy the lower portion of the column 13 and, if deep enough, the adjacent portion of the evaporator 12. During the heating-condensing period, some of the vapors flow from the sleeve 35 upwardly through the casing 36 and immediately escape therefrom through the port 38 into the receiver 11, while the remainder of the vapors bubble up through the liquid in the gas lift 41 and, during the incipient stage of said period, contribute their lifting power to that of the gas bubbles generated within said lift, as above explained, in the work of elevating the residue liquid. All vapors that pass through the gas lift return through the portion 39 of casing 36 and join those that directly enter the receiver 11 through the port 38. Thus, early in the heating period, before the major condensing phase begins, these early vapors or a considerable part thereof, condense within the relatively cool receiver and/or evaporator and, tending to gravitate to the lowest part, displace the residue liquid upwardly through the transfer tube 37 into the casing 36 where it is accessible to the gas lift 41, it being understood, of course, that the respective bodies of liquid in the casing 36 and receiver-evaporator 10 assume a common level. When discharged from the laterally turned upper end 40 of the gas lift, the residue liquid gravitates through the conduit 45 to the generator-absorber, while, as above pointed out, the vapors pass back through the portion 39 of the casing 36 and through the port 38 to the receiver 11. Therefore it will be seen that very early in the heating period, before the major condensing phase sets in, the receiver-evaporator is emptied (down to the bottom of the transfer tube 37) of residue liquid.

As the heating-condensing period progresses, or, in other words, as the major condensing phase gets under way, the vapors entering the receiver pass on through the conduit 50 to the condenser 51 in which they are partially or wholly condensed and by which they are discharged through the trap 54 into the reservoir 53, any vapors failing to liquefy up to this point condensing within the reservoir, this action being promoted by the fact that the rise of the vapors through any liquid that has accumulated within the reservoir is prolonged by the deflector 56 along the underside of which the vapors pass from the lower to the higher end thereof.

As is well known to those familiar with the subject of intermittent absorption refrigeration, condensation of the vapors at the temperature of the condenser is made possible by the high pressure prevailing within the system during the heating-condensing period, and condensation continues throughout the said period and, in the apparatus herein disclosed, until the condensate well fills the reservoir 53, the same being held therein by the pressure within the system against a substantially balanced pressure that is built up within the top of the reservoir 53 above the body of liquid therein. During a part or all of the heating-condensing period, the gas lift 41 functions to return the residue, the duration of its operation depending upon the quantity of liquid that is to be returned. It may also be mentioned that in the operation of the gas lift there is little or no danger of any appreciable amount of anhydrous refrigerant being returned to the generator-absorber because all during the heating-condensing period the freshly distilled charge is retained within the reservoir 53, as above pointed out.

When the application of heat to the generator-absorber ceases—in the present case by the total consumption of the fuel supply—the generator absorber starts to cool and the pressure throughout the system begins to fall. This change in conditions initiates the so-called cooling-absorbing period or phase of the cycle of operation.

Immediately upon the drop in pressure, the anhydrous refrigerant in the reservoir 53 is transferred through the trap 54, tube 55 and the adjacent portion of the conduit 50 to the receiver-evaporator, filling the same to about the level indicated by the dotted line b. As the cooling-absorbing period gets under way, the gas generated in the receiver-evaporator by the heat abstracted from the refrigeration compartment in which the brine box 60 that contains the evaporator 12 is located, flows through the port 38, the upper part of the casing 36, the portion 39 thereof, and the gas return conduit 45 to the body of liquid in the generator-absorber 1. The level of the liquid in the generator-absorber, at this phase of the operation, is indicated by the dotted line c.

As the gas returns it is absorbed by the relatively weak liquor in the generator-absorber, and this phase of the cycle continues until the receiver-evaporator is practically exhausted of anhydrous refrigerant. Another cycle of operation may then be inaugurated by the application of heat to the generator-absorber, as by lighting the burners 16.

Turning now to a consideration of the more purely structural features of the invention as illustrated in Figs. 1 and 3 to 13, the above described refrigerating system, consisting of the elements diagrammatically represented in Fig. 2, is housed within a cabinet designated generally by the reference numeral 65 (Fig. 1). Insulated walls 66 enclose a refrigeration compartment 67 within which is arranged the receiver-evaporator 10, the vessel 11 which constitutes the receiver proper whereof is partly enclosed within the insulated top 68 and partly within a casing 69 that is packed with insulation in accordance with common practice. The brine box 60 is exposed to the interior of the compartment 67. A freezing space 70 for the accommodation of ice trays (not shown) or anything requiring a freezing temperature, is formed by a cavity that opens through the front of the brine box.

The previously mentioned tank 33 is mounted upon the cabinet 65, while the generator-absorber 1 is located within a flue 72 that is enclosed by the casing of the cabinet along one side of the box-like structure comprising the insulated walls 66. The cabinet casing, including said box-like structure, is supported upon a base frame 73 that is sustained by legs 74. The flue 72 is open at top and bottom and arranged therein below the generator-absorber 1 is the heating device 15. The generator-absorber 1 is equipped with heat abstracting fins 75; and a suitable grid or screen 76 is desirably positioned across the top of the flue 72.

It is evident from Fig. 1 that, when the heating means or device 15 is not in operation, the generator-absorber will be subjected to atmospheric or room temperature, an upward draft of fresh air being induced through the flue by the heat that is given off by the parts housed therein.

As hereinbefore pointed out, the coolness and weakness of the mixture or liquor in the generator-absorber are conducive of fast absorption of the gas returning to the generator-absorber, and fast absorption results in a rapid lowering of the pressure within the system and consequently an equally rapid lowering of the temperature of the contents of the receiver-evaporator, this being due to the previously mentioned fact that there is a fixed relation between pressure and temperature.

It will be seen, therefore, that if the apparatus is designed to produce, when charged with liquor of a certain concentration, satisfactory refrigeration under abnormally high room or atmospheric temperatures and heavy loads, or, in other words, to maintain an evaporator temperature of approximately 15° F., as pointed out in the preamble, there is danger of producing too low a refrigerating temperature in case the room or atmospheric temperature drops to an abnormally low value, especially under light load. For example: if the apparatus is conditioned to refrigerate satisfactorily in a room temperature of from 90° to 110° F., unless measures are taken to avoid it the refrigerating temperature will drop too low in the event the room temperature falls to around 60° F. The reasons are clear from the foregoing. The low room temperature will be imparted to the contents of the generator-absorber. This will speed up absorption, resulting in a drop in pressure throughout the system and a consequential marked decline in evaporator temperature. Reducing this to figures: if an evaporator temperature of about 15° F. is attained when the room temperature to which the generator-absorber is exposed is around 100° F. (the percentage of concentration and other factors being such as would affect this), the evaporator temperature will be considerably below zero when the room temperature falls to 60° F. To meet such conditions—that is, to avoid too low a refrigerating temperature under the circumstances mentioned, we have devised means for governing the speed of absorption, thereby to control the pressure in the system and likewise the temperature of the refrigerant in the receiver-evaporator, or, in other words, the refrigerating temperature.

Referring first to the form of the invention illustrated in Figs. 1 to 13, 80 is a tilting vessel that is pivotally supported upon a shaft 81 which, in turn, is supported by and between uprights 82 that are fastened at their ends to the top and bottom portions of the wall of the lower vessel 3 of the generator-absorber. The shaft 81 extends through the perforated upturned ends of a member 83 that is fastened to a part of the vessel 80, as best shown in Fig. 12. The tilting vessel is retained in a central position on the shaft 81 by spacers 84. The body of the vessel 80 is oval shaped in plan and rising from it is a stack 85 that is somewhat flattened transversely at the top so as to cause it to flare in a direction longitudinally of the vessel. A broad, shallow spout 87 extends from one end of the vessel 80 and is of sufficient length to nearly reach the remote end of the vessel 3. The stack 85 rises through the neck 5 by which the forward ends of the vessels 2 and 3 are communicatively connected, and the gas return conduit 45 extends downwardly through the stack and thence laterally and upwardly to a point where its discharge end 46 opens into a gas dome that is formed in the top of the tilting vessel by the projection of the stack 85 downwardly into the vessel to about the plane of the spout 87. The gas dome is in open communication with the spout through a part 88 to whose inclined upper wall the previously mentioned member 83 is attached. A circulation tube 89 joins the underside of the spout 87 near the vessel 80 and depends to within a short distance of the bottom of the vessel 3. The purpose of this tube will later appear.

What is, in effect, a bell crank, designated generally by the reference numeral 90, and shown in perspective in Fig. 13, is pivoted on a shaft 91 supported by and between opposed sides of a dished member 92 that is rigidly held in position in the adjacent end of the vessel 3 by pins 95 whose opposite ends are secured, as by welding, to said member and the wall of the vessel. The free end of the longer branch of the bell crank is loosely connected by links 96 to the upturned ends of a member 97 that is fastened to the underside of the spout 87.

The bell crank 90 consists of side members 98, each having the form of a narrow and relatively deep channel. Each channel is considerably deeper at its forward end and is here reinforced by a block 99 that is disposed between its flanges. Extending between the upper forward corners of the side members 98 is a rod 100 on which is supported, centrally between said members, a head 101. Spacers 102 are mounted on the shaft 91 between the opposed side members 98 of the bell crank as well as between said side members and the bearings of the member 92 within which the ends of the shaft 91 are supported. As shown best in Fig. 7, the ends of a cross rod 103 constitute the pivotal connections between the rear ends of the side members 98 and the links 96, while the connections between the upper ends of said links and the member 97 are effected through the reduced ends of a rod 104.

The head 101 constitutes the terminal of the shorter branch of the bell crank 90 and its reduced forward end bears upon a diaphragm 105. The periphery of this diaphragm is welded or otherwise secured to the flanged edge of a relatively shallow diaphragm casing 106, and occupying the space between the diaphragm and the opposed wall of the casing are circular plates 107 and 108, shown in face view, respectively, in Figs. 9 and 10. Each plate has a series of radial kerfs 109 that extend outwardly from near its center and open through its edge. A hole 110 is made in the center of the plate 108 for the accommodation of a coil spring 111 that is compressed between the central portion of the plate 107 and the end wall of a cap 112 that is threaded onto the outer end of a boss 113 that projects forwardly from the diaphragm casing 106 through the dished member 92 and the adjacent end wall of the vessel 3 and encloses the spring 111. The diaphragm casing is vented through an orifice 114 in the cap 112. It is clear, from this construction, that the tension of the spring 111 may be adjusted by screwing the cap 112 inwardly and outwardly along the boss 113, and to facilitate the operation, the cap is knurled at 115 and shaped at 116 to receive a suitable wrench. The hub portion 117 of an indicator finger 118 is secured to the cap 112 by a set screw 119, and associated with the indicator is a dial 120 that surrounds and is fastened to the boss 113 adjacent the end wall of the vessel 3. From a central position at the top of the dial 120 (Fig. 11) the indicator 118 may be swung to the right or left through substantially 180°, against a stop 121, to effect a raise in or lowering of the refrigerating temperature of the apparatus, as will be hereinafter more fully explained. It may be pointed out at this time, however, that, by reason of the construction described, the diaphragm is rendered sensitive to slight pressure changes yet substantial enough to withstand very high pressures. Because the diaphragm 105 is supported substantially throughout its entire area by the plate 107, it may be constructed of sufficiently light material to possess the required flexibility to make it responsive to slight pressure changes, it being noted from Fig. 4 that said plate 107 follows the diaphragm when the latter is bulged inwardly by the spring 111. When the diaphragm is acted upon by pressure in the system, in opposition to said spring, in which condition it is shown in Fig. 3, the two plates 107 and 108 fill the cavity of the casing 106 and provide a support for the diaphragm throughout its area.

Because of the location of its pivotal support relative to its mass, the tilting vessel 80 tends to overbalance to the position shown in Fig. 3. With the vessel in this position, the refrigerant gas returning from the receiver-evaporator section of the system through the conduit 45 is expelled through the discharge end 46 thereof into the gas dome of said vessel and escapes therefrom in the form of bubbles through the spout 87. It will be observed that liquor fills all parts of the tilting vessel excepting the gas dome and the top portion of the stack 85. To avoid undue retardation of the movement of the gas through the spout 87, free circulation of the liquid therethrough is afforded by the circulation tube 89 which draws liquid from the relatively cool and weak strata near the bottom of the generator-absorber and leads it to the region of contact between the returning gas and the body of liquor in the spout 87. By this arrangement, absorption is accelerated, an effect highly desirable when low pressure and consequently low refrigerating temperature are desired. As soon, however, as the pressure falls so low as to result in an undesirably or dangerously low refrigerating temperature, the spring 111 will project the diaphragm 105 inwardly, as shown in Fig. 4, thereby to rock the bell crank 90 in a direction to depress its rear end and, through its connection with the tilting vessel, rock the latter to the position shown in the view just mentioned.

Now, instead of the returning gas escaping from the gas dome of the tilting vessel by way of the spout 87, as above described, it escapes about the forward lower edge of the stack 85 upwardly through said stack into the gas space at the top of the generator-absorber. Here it is absorbed more slowly by contact with the top surface of the body of liquor and as the liquor adjacent said surface becomes enriched by its gradual absorption of the gas, the rate of absorption will continue to diminish, this slowing down of the process being also effected by the somewhat higher temperature of the upper strata.

As a consequence of this decreased rate of absorption, the pressure within the system, as well as the refrigerating temperature, will rise, the control continuing to function in this manner until the pressure overcomes the tension of the spring 11 and returns the parts to the position shown in Fig. 3. In practice, the parts may assume an intermediate position and, as a consequence, a substantially stable pressure and temperature may be maintained within reasonable limits.

It is clear from the foregoing that by turning the indicator 118 to the left so as to back off the cap 112 and reduce the tension of the spring 111, the control will respond to a lower temperature; and when adjusted in the other direction, the conditions will be reversed to effect a higher refrigerating temperature.

The general construction and mode of operation of the refrigerating systems illustrated in Figs. 14, 17 and 18 will be readily understood from what has already been said with respect to the form of the invention illustrated in Figs. 1 to 13. In the diagrams of Figs. 14, 17 and 18, the parts of the systems, exclusive of the controls that constitute the subject matter of this case, are designated by the same reference numerals as are applied to the corresponding parts of the system diagrammatically illustrated in Fig. 2, augmented by the exponents a, b and c in the respective Figs. 14, 17 and 18.

The system illustrated in Fig. 14 is considerably simpler than the others herein disclosed, although this has nothing to do with the form of the invention incorporated therein. Here the generator-absorber 1a is shown as consisting of a single vessel, and the vapors therefrom are conducted directly through a vapor delivery conduit 31a to the dehydrator 32a, thence through a conduit 34a to the bottom of the receiver-evaporator 10a, which is also shown as a single vessel. The outlet of the conduit 34a is directed upwardly beneath the flared lower end of a gas lift 41a by which the residue liquid is returned to the generator-absorber through the gas return conduit 45a. In the present case, the reservoir 53a serves not only as a means for holding the fresh refrigerant condensate in reserve during the heating-condensing period, but also as the sole condenser, in contradistinction to the other systems herein disclosed wherein the condenser is a separate unit.

The embodiment of the invention at present under consideration includes a casing 125 that is housed within the generator-absorber 1a and to the upper portion of which the gas return conduit 45a leads. The casing has a valve controlled outlet 126 that is situated below the minimum liquid level in the vessel 1a and from whose upper side a baffle 127 extends toward the remote end of said vessel. The portion of the casing below the plane of the outlet 126 is in open communication with the top portion of the generator-absorber above the maximum liquid level therein through a conduit 128.

As will best be seen from Fig. 15, a valve 130 controls the outlet of gas from the casing 125 through the opening 126 by cooperation with a seat surrounding the inner end of said opening, and the valve is reciprocally supported in position by its stem 131 that is slidably engaged through a guide 132 disposed centrally of the outlet opening. This is desirably effected by drilling an axial hole through a boss 133, counterboring the same at its inner end, as indicated at 134, and then drilling a plurality of holes 135 about the central bore within which the valve stem is guided. A comparatively light spring 136 surrounds the stem 131 and is compressed between the valve and the bottom wall of the counterbore 134. This spring tends to retract the valve and hold it against a diaphragm 140. This diaphragm is shown as forming a part of a sheet metal housing designated generally by the reference numeral 141 whose opposed wall 142 has a central opening surrounded by a flange 143 that fits within an opening in the front wall of the casing 125. From this wall projects a boss 145 that is extended through and is suitably sealed within an opening in the corresponding end wall of the generator-absorber. The outer end of the boss is threaded for the application of a cap 146, vented at 147, and between 20 which and a cup 148 that is applied to the inner side of the diaphragm 140 in line with the valve 130, is compressed a relatively heavy spring 149. The tension of the spring may be adjusted by screwing the cap 146 inwardly and outwardly, as in the form of the invention first described, thereby to determine the pressure at which the valve 130 will open. An indicator 150, cooperating with a dial 151 may be employed in this case, as in the first.

The diaphragm 140 and the opposite wall 142 of the housing 141 are reinforced by annular plates 152 and 153, respectively, and occupying the space between these plates is a spiral spacer 154. When the diaphragm assembly is fully contracted, the sheet metal walls of the housing 141 contact the adjacent faces of the plates 152 and 153 and said plates, in turn, bear against the sides of the spacer 154. This permits sufficiently light metal to be employed for the housing 141— more particularly for the diaphragm 140—to insure the required sensitiveness, at the same time providing requisite strength when the assembly is subjected to high pressure.

When the pressure in the system is sufficiently high to effect this result, the diaphragm is contacted against the tension of the spring 149 thereby to permit the spring 136 to open the valve 130 and gas returning through the conduit 45a will enter the casing 125 and escape therefrom through the outlet opening 126 beneath the baffle 127 into the body of liquor contained within the vessel 1a. Being thus delivered to said liquor, a high rate of absorption prevails, resulting in a low pressure within the system and a consequential low temperature of refrigerant in the receiver-evaporator. This action will continue until the pressure falls to such a point that an undesirably low refrigerating temperature is approached when the spring 149 will distend the diaphragm and close the valve 138 against the action of the spring 136 thereby to shunt the returning gas through the conduit 128 to the space within the generator-absorber above the body of liquor. This will immediately reduce the rate of absorption, for the reasons given in connection with the first described form of the invention, and the pressure within the system will build up and cause a rise in the temperature of the refrigerant in the receiver-evaporator.

According to the invention as illustrated in Fig. 17, a chamber 155 is interposed between the upper and lower parts of the receiver-evaporator 10b, and an auxiliary gas return conduit 156 leads from a portion of the chamber 155 remote from where said chamber communicates through a passageway 157 with the vessel 11ᵇ, to the generator-absorber 1ᵇ, entering the same through the top and terminating below the minimum liquid level therein inside a sleeve 158. This sleeve communicates with the interior of the generator-absorber near the top and bottom walls thereof. In this case the main gas return conduit 45ᵇ opens into the generator-absorber below the minimum liquid level therein beneath a baffle 159. Pivoted at 160 and thus supported within the chamber 155 is a gas deflector 161. When in one of its extreme positions (illustrated in full lines) said deflector will direct gas, rising as bubbles from the evaporator 12ᵇ through the passageway 157 into the vessel 11ᵇ from where it will find its way through the port 38ᵇ, the portion 39ᵇ of the casing 36ᵇ, and gas return conduit 45ᵇ to the generator-absorber 1ᵇ. Here said gas will be speedily absorbed by the liquor, thereby to lower the pressure within the system and reduce the refrigerating temperature.

The gas deflector 161 is adapted to be moved to the other of its extreme positions (shown in dotted lines) by thermostatic means subjected to the temperature of the receiver-evaporator. In the present instance, this thermostatic means includes the vessel 11ᵇ. This is brought about in the following manner: A bar 162 has one of its ends swiveled at 163 to an arm 164 that is operatively connected to the deflector 161 and may consist of a part of a pivoted lever whose opposite end carries the deflector. The bar 162, preferably composed of what is known as "invar" metal, is shown as extending longitudinally, and throughout considerable of the length of the vessel 11ᵇ, and its end remote from the arm 164 is threaded within a boss 166 in the end wall of the vessel. The outer end of said boss is adapted to be sealed by a cap 167. The corresponding end of the bar is formed for the reception of a tool by which it may be turned so that by the removal of the cap 167, the bar may be adjusted to vary the action of the control.

When the pressure within the system becomes so low that the resulting low temperature of the receiver-evaporator causes the vessel 11ᵇ to contract, it will thrust the bar 162 in a direction to swing the deflector 161 toward the dotted line position, and as it swings in this direction above the horizontal it will cause the gas bubbles that rise from the evaporator to ascend through the adjacent end of the auxiliary gas return conduit 156 and pass on to the sleeve 158 through which they will rise to the gas space in the top of the generator-absorber 1ᵇ. This will result in a slowing down of absorption and a corresponding rise in pressure and refrigerating temperature.

As in the case just described, the modification of the invention next to be considered, and illustrated diagrammatically in Fig. 18, includes thermostatic means for actuating the control. In this instance, however, said means is subjected to the temperature of the refrigeration compartment instead of directly to the temperature of the receiver-evaporator. In this case an auxiliary gas return conduit comprising sections 170 and 171 leads from the vessel 11ᶜ of the receiver-evaporator 10ᶜ to the generator-absorber 1ᶜ opening into a sleeve 172 below the minimum liquid level in the generator-absorber. The sleeve 172 is arranged vertically and its interior communicates with the generator-absorber adjacent the top and bottom of the latter. Between the sections 170 and 171 of the auxiliary gas return conduit is a valve casing 173, having compartments 174 and 175 into which said sections open, respectively, and these compartments are separated by a partition 176 having an opening 177 surrounded by a seat with which a valve 178 is arranged to cooperate. This valve is carried by a stem 179 whose ends are connected with bellows 180 and 181, the former being connected through a tube 182 with a bulb 183 that is shown as disposed within the top of the refrigeration compartment 67ᶜ. The enclosure of the bellows 180, tube 182 and bulb 183 contains a quantity of suitable thermosensitive fluid. The other bellows 181 houses a compression spring 185 that is compressed between an adjusting screw 186, threaded through the adjacent end of the valve casing 173, and the opposed end wall of the bellows.

When the temperature of the refrigeration compartment 67ᶜ is high enough to create, by its influence upon the bulb 183, sufficient pressure in the bellows 180 to close the valve 187 against the tension of the spring 185, gas will return to the generator-absorber through the main gas return conduit 45ᶜ, being expelled therefrom into the body of liquor below the baffle 188, effecting fast absorption and low pressure which will result in a low evaporator temperature. This will cause the temperature of the refrigeration chamber 67ᶜ to drop and when it becomes sufficiently low to cause reduced pressure within and contraction of the bellows 180, the valve 178 will be opened by the spring 185 thereby to permit the gas to return by way of the auxiliary gas return conduit. The sleeve 172 will direct the returning gas to the space within the generator-absorber 1ᶜ above the body of liquor, causing the speed of absorption to decrease for reasons hereinbefore explained, and this will create a higher pressure within the system, resulting in a higher evaporator temperature. As the temperature of the refrigeration compartment rises as a consequence of the higher evaporator temperature the thermosensitive fluid in the bulb 183 will be expanded, thereby to distend the bellows 180 and close the valve 178 whereupon the returning gas will assume its normal course through the main gas return conduit 45ᶜ.

Indicating means are provided in conjunction with the adjustment in each of the embodiments of the invention illustrated, respectively, in Figs. 17 and 18. As will be seen by reference to Fig. 17ᵃ, the end of the boss 166 bears indicia showing the direction the bar 162 should be turned to accomplish a higher or lower refrigerating temperature; and by reference to Fig. 18ᵃ, it will be seen that similar indicia is carried by the end wall of the valve casing 173 for association with the adjusting screw 186.

Having thus described our invention, what we claim is:

1. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in distributing the returning gas selectively to different parts of the body of liquor in the generator-absorber section for the purpose specified.

2. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in controlling the distribution of the returning gas selectively to different parts of the body of liquor in the generator-absorber section by the pressure in the system.

3. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in controlling the distribution of the returning gas selectively to different parts of the body of liquor in the generator-absorber section by conditions within the system.

4. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in controlling the distribution of the returning gas selectively to different parts of the body of liquor in the generator-absorber section by the temperature in the receiver-evaporator section.

5. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in distributing the returning gas selectively to different parts of the quantity of liquor in the generator-absorber section selected according to the temperature in the receiver-evaporator section.

6. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in directing the returning gas selectively to different parts of the quantity of liquor in the generator-absorber section thereby to vary the rate of absorption for the purpose specified.

7. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in distributing the returning gas selectively to different parts of the quantity of liquor in the generator-absorber section selected according to the pressure in the system.

8. In the method of refrigeration which involves intermittently heating a body of refrigerant liquor in the generator-absorber section of the system, thereby to vaporize the refrigerant, and subsequently condensing and delivering said refrigerant to the receiver-evaporator section, and during the interims between heating periods returning the refrigerant in the form of gas to the generator-absorber section; the step which consists in delivering the returning gas selectively to different parts of the quantity of liquor in the generator-absorber section selected according to the absorbing capacity of said parts thereby to govern the rate of absorption and consequently the pressure in the system and the temperature of the refrigerant in the receiver-evaporator section.

9. In an absorption refrigerating system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; means for selectively directing the returning gas to different parts of the quantity of liquor in the generator-absorber section for the purpose specified.

10. In an absorption refrigerating system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; means responsive to conditions in the system for delivering the returning gas selectively to different parts of the quantity of liquor in the generator-absorber section for the purpose specified.

11. In an absorption refrigeration system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; means responsive to the pressure within the system for directing the returning gas selectively to different parts of the quantity of liquor in the generator-absorber section.

12. In an absorption refrigerating system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; means responsive to the temperature in the receiver-evaporator section for directing the returning gas selectively to different parts of the quantity of liquor in the generator-absorber section.

13. In an absorption refrigerating system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; pressure actuated control means situated in the generator-absorber section for directing the returning gas selectively to different parts of the quantity of liquor in said section.

14. In an absorption refrigerating system including a generator-absorber section, a receiver-evaporator section, means for administering heat at intervals to the generator-absorber section thereby to generate vapors from the liquor therein, means for conducting said vapors from the generator-absorber section, condensing the same, and delivering the condensate to the receiver-evaporator section, and further means for returning the refrigerant gas from the receiver-evaporator section to the generator-absorber section between heating-condensing periods; temperature actuated control means for delivering the returning gas selectively to different parts of the quantity of liquor in the generator-absorber section.

15. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; dual gas return means for conveying the refrigerant gas from the receiver-evaporator section and respectively delivering it to different parts of the quantity of liquor in the generator-absorber section, and selective means for determining to which part the gas will be delivered.

16. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means for conducting the refrigerant gas from the receiver evaporator section to the generator-absorber section between heating-condensing periods, said means having branches for conducting the gas to different parts of the quantity of liquor in the generator-absorber section, and selective means for determining through which branch the gas will be expelled.

17. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means for conducting the refrigerant gas from the receiver-evaporator section to the generator-absorber section between heating-condensing periods, said means having branches for conducting the gas to different parts of the quantity of liquor in the generator-absorber section, selective means for determining through which branch the gas will be expelled, and means subjected to and operated by the pressure in the system for actuating said selective means.

18. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means for conducting the refrigerant gas from the receiver-evaporator section to the generator-absorber section between heating-condensing periods, said means having branches for conducting the gas to different parts of the quantity of liquor in the generator-absorber section, selective means for determining through which branch the gas will be expelled, and thermo-sensitive means subjected to and operated by the temperature in the receiver-evaporator section for actuating the selective means.

19. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; a vessel communicating with the generator-absorber section, gas return means for conducting the refrigerant gas from the receiver-evaporator section to said vessel between heating-condensing periods, said vessel having two outlets serving, respectively, to deliver the gas to different parts of the quantity of liquor in the generator-absorber section, and means subjected to and operated by the pressure in the system for controlling the passage of the gas through said outlets.

20. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; a vessel situated within the generator-absorber section, gas return means for conducting the refrigerant gas from the receiver-evaporator section to said vessel between heating-condensing periods, said vessel having two outlets serving, respectively, to deliver the gas the different parts of the quantity of liquor in the generator-absorber section, and means subjected to and operated by the pressure in the system for controlling the passage of the gas through said outlets.

21. In an absorption refrigerating system including a generator-absorber, a receiver-evaporator, means for heating the contents of the generator-absorber thereby to generate vapor therefrom, and means for conducting said vapors from the generator-absorber, condensing the same, and delivering the condensate to the receiver-evaporator; a vessel supported for oscillation within the generator-absorber, gas return means for conveying the refrigerant gas from the receiver-evaporator to said vessel, the vessel having one outlet through which the gas escapes into the liquor in the generator-absorber when the vessel is tilted in one direction, and a second outlet through which the gas escapes to a point above the maximum liquid level in the generator-absorber when the vessel is tilted in the opposite direction, and means for tilting said vessel.

22. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator; a vessel supported for oscillation within the generator-absorber, gas return means for conveying the refrigerant gas from the receiver-evaporator to said vessel, the vessel having one outlet through which the gas escapes into the liquor in the generator-absorber when the vessel is tilted in one direction, and a second outlet through which the gas escapes to a point above the maximum liquid level in the generator-absorber when the vessel is tilted in the opposite direction, the vessel having a circulation tube for admitting liquid to the vessel and setting up a circulation therethrough when the gas is escaping through the first mentioned outlet, and means for tilting the vessel.

23. In an absorption refrigerating system including a generator-absorber, a receiver-evaporator, means for heating the contents of the generator-absorber thereby to generate vapor therefrom, and means for conducting said vapors from the generator-absorber, condensing the same, and delivering the condensate to the receiver-evaporator; a vessel supported for oscillation within the generator-absorber and including a gas dome, gas return means for conveying the refrigerant gas from the receiver-evaporator to the gas dome of said vessel, the vessel having a spout through which the gas escapes from said dome when the vessel is tilted in one direction and so arranged as to inject the gas into the liquor in the generator-absorber a material distance below the minimum level thereof, the vessel having a stack through which the gas escapes from said dome to a point above the maximum liquid level in the generator-absorber when the vessel is tilted in the opposite direction, and means for tilting said vessel.

24. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator; a vessel supported for oscillation within the generator-absorber and including a gas dome, gas return means for conveying the refrigerant gas from the receiver-evaporator to the gas dome of said vessel, the vessel having a spout through which the gas escapes from said dome when the vessel is tilted in one direction and so arranged as to inject the gas into the liquor in the generator-absorber a material distance below the minimum level thereof, the vessel having a stack through which the gas escapes from said dome to a point above the maximum liquid level in the generator-absorber when the vessel is tilted in the opposite direction, the vessel having a circulation tube for admitting liquid to the vessel and setting up therein a circulation through the spout when the gas is escaping therethrough, and means for tilting the vessel.

25. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator; a vessel supported for oscillation within the generator-absorber, gas return means for conveying the refrigerant gas from the receiver-evaporator to said vessel, the vessel having one outlet through which the gas escapes into the liquor in the generator-absorber when the vessel is tilted in one direction, and a second outlet through which the gas escapes to a point above the maximum liquid level in the generator-absorber when the vessel is tilted in the opposite direction, and means subjected to and operated by the pressure in the system for tilting the vessel.

26. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator; a vessel supported for oscillation within the generator-absorber, gas return means for conveying the refrigerant gas from the receiver-evaporator to said vessel, the vessel having one outlet through which the gas escapes when the vessel is tilted in one direction and so arranged as to inject the gas into the liquor in the generator-absorber a material distance below the minimum level thereof, the vessel having a second outlet through which the gas escapes to a point above the maximum liquid level in the generator-absorber when the vessel is tilted in the opposite direction, means tending to rock the vessel in one direction, and further means subjected to and operated by the pressure in the system for rocking the vessel in the other direction.

27. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator, a vessel supported for oscillation within the generator-absorber, gas return means for conveying the refrigerant gas from the receiver-evaporator to said vessel, the vessel having one outlet through which the gas escapes when the vessel is tilted in one direction and so arranged as to inject the gas into the liquor in the generator-absorber a material distance below the minimum level thereof, the vessel having a second outlet through which the gas escapes to a point above the maximum liquid level in the generator-absorber when the vessel is tilted in the opposite direction, an instrumentality tending to rock the vessel in one direction, means subjected to and operated by the pressure in the system for rocking the vessel in the other direction, and an adjustment for altering the action of said instrumentality.

28. In an absorption refrigerating system including a generator-absorber, a receiver-evaporator, means for heating the contents of the generator-absorber whereby to generate vapor therefrom, and means for conducting said vapors from the generator-absorber, condensing the same, and delivering the condensate to the receiver-evaporator; a vessel supported for oscillation within the generator-absorber, gas return means for conveying the refrigerant gas from the receiver-evaporator to said vessel, the vessel having one outlet through which the gas escapes when the vessel is tilted in one direction and so arranged as to inject the gas into the liquor in the generator-absorber a material distance below the minimum level thereof, the vessel having a second outlet through which the gas escapes to a point above the maximum liquid level in the generator-absorber when the vessel is tilted in the opposite direction, power storage means tending to rock the vessel in one direction, means subjected to and operated by the pressure in the system for rocking the vessel in the other direction, adjusting means for varying the power of said power storage means, and an indicator associated with said adjusting means.

29. In a refrigeration apparatus including an absorber permanently containing a body of liquor, consisting of a substantially fixed amount of absorbent fluid and a variable amount of refrigerant fluid and whose different parts are of different absorbing capacities, and a gas return conduit for delivering refrigerant gas to the absorber, an instrumentality for directing the gas from said conduit selectively to different parts of the body of liquor thereby to control the speed of absorption and consequently the pressure within the system for the purpose specified.

30. In a refrigeration apparatus including an absorber permanently containing a body of liquor, consisting of a substantially fixed amount of absorbent fluid and a variable amount of refrigerant fluid and whose different parts are of different absorbing capacities, and a gas return conduit for delivering refrigerant gas to the absorber, an instrumentality for distributing the gas from said conduit, and means for causing the same to direct the gas selectively to different parts of the body of liquor thereby to control the speed of absorption and consequently the pressure within the system for the purpose specified.

31. In means for controlling the refrigerating temperature of intermittent absorption refrigeration apparatus, a vessel situated within the absorber thereof, a gas return conduit for delivering refrigerant gas to said vessel, the vessel having outlets for directing gas to different parts, respectively, of the body of liquor in the absorber, and means for controlling the discharge of gas selectively through said outlets.

32. In means for controlling the refrigerating temperature of intermittent absorption refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, and means for tilting the vessel.

33. In means for controlling the refrigerating temperature of intermittent absorption refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, and means responsive to conditions within the refrigerating system of the apparatus for tilting the vessel.

34. In means for controlling the refrigerating temperature of intermittent absorption refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, and means subjected to and operated by the pressure in the refrigerating system of the apparatus for tilting the vessel.

35. In means for controlling the refrigerating temperature of intermittent absorption refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, a lever pivotally supported adjacent the vessel and having operative connection therewith, and means subjected to and operated by the pressure in the refrigerating system of the apparatus and cooperating with said lever for tilting the vessel through the intervention thereof.

36. In means for controlling the refrigerating temperature of intermittent absorption-refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, a bell crank pivotally supported adjacent the vessel and having one branch operatively connected thereto, a diaphragm for cooperation with the other branch, and a spring acting thereon to cause the diaphragm to tilt the vessel in one direction through the intervention of the bell crank, the pressure in the refrigerating system of the apparatus acting upon the diaphragm in opposition to said spring to cause the vessel to tilt in the opposite direction.

37. In means for controlling the refrigerating temperature of intermittent absorption refrigeration apparatus, a vessel supported for oscillation within the absorber thereof, a gas return conduit for delivering refrigerant gas to said vessel, the vessel having two outlets that serve, respectively, to conduct the gas to different parts of the body of liquor in the absorber when the vessel is tilted in one direction or another, a bell crank pivotally supported adjacent the vessel and having one branch operatively connected thereto, a diaphragm for cooperation with the other branch, a spring acting thereon to cause the diaphragm to tilt the vessel in one direction through the intervention of the bell crank, the pressure within the refrigerating system of the apparatus acting upon the diaphragm in opposition to said spring to cause the vessel to tilt in the opposite direction, and means for adjusting the tension of said spring.

38. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means including a vessel for conducting the refrigerant gas from the receiver-evaporator section to the generator-absorber section between heating-condensing periods, said vessel having an outlet through which the gas is injected into the liquor in the generator-absorber section a material distance below the level thereof and a second outlet at a different elevation from the first through which the gas is conducted to a point above the maximum liquid level in the generator-absorber section, a valve for controlling the higher outlet, and means subjected to and operated by the pressure in the system for actuating said valve.

39. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means including a vessel for conducting the refrigerant gas from the receiver-evaporator section to the generator-absorber section between heating-condensing periods, said vessel having an outlet through which the gas is injected into the liquor in the generator-absorber section a material distance below the level thereof and a second outlet at a different elevation from the first, through which the gas is conducted to a point above the maximum liquid level in the generator-absorber section, a valve for controlling the higher outlet, means tending to close said valve, and further means subjected to and operated by the pressure in the system for opening said valve.

40. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means including a vessel for conducting the refrigerant gas from the receiver-evaporator section to the generator-absorber section between heating-condensing periods, said vessel having an outlet through which the gas is injected into the liquor in the generator-absorber section a material distance below the level thereof and a second outlet at a different elevation from the first through which the gas is conducted to a point above the maximum liquid level in the generator-absorber section, a valve for controlling the higher outlet, a spring tending to close said valve, means subjected to and operated by the pressure in the system for opening the valve in opposition to said spring, and means for adjusting the tension of the spring.

41. In an absorption refrigerating system including a generator-absorber section, a receiver-evaporator section, means for administering heat at intervals to the generator-absorber section thereby to generate vapors from the liquor therein, and means for conducting said vapors from the generator-absorber section, condensing the same, and delivering the condensate to the receiver-evaporator section; gas return means including a vessel for conducting the refrigerant gas from the receiver-evaporator section to the generator-absorber section between heating-condensing periods, said vessel having an outlet through which the gas is injected into the liquor in the generator-absorber section a material distance below the level thereof and a second outlet at a different elevation from the first through which the gas is conducted to a point above the maximum liquid level in the generator-absorber section, a valve for controlling the higher outlet, a spring tending to close said valve, means subjected to and operated by the pressure in the system for opening the valve in opposition to said spring, means for adjusting the tension of the spring, and an indicator associated with said adjusting means.

LEE S. CHADWICK.
MARC RESEK.
WILBUR G. MIDNIGHT.